(No Model.)
R. T. BISHOP.
WHEEL.
No. 293,619. Patented Feb. 19, 1884.
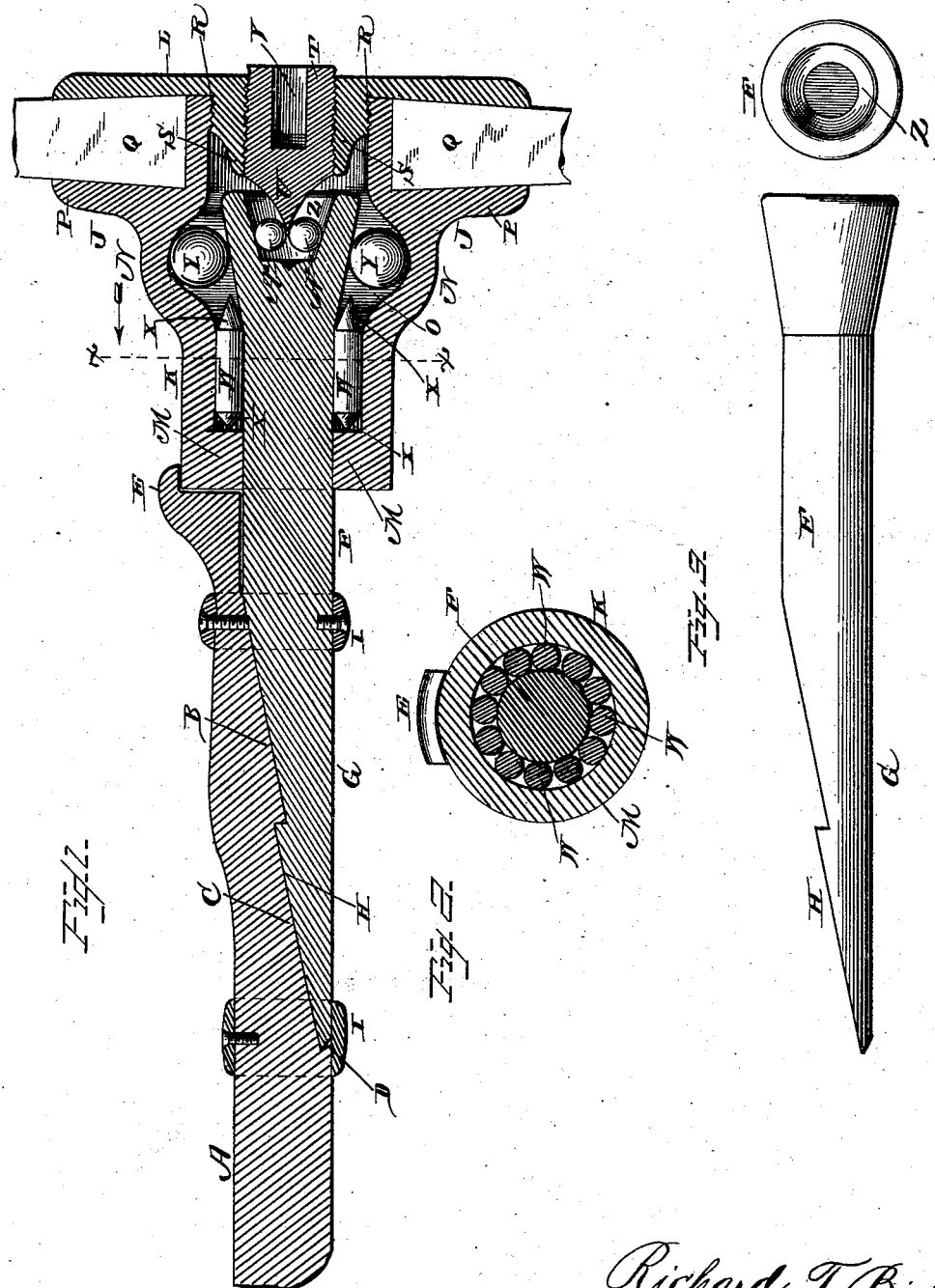
WITNESSES
F. L. Durand
E. G. Siggers
Richard T. Bishop,
INVENTOR
by C. A. Snow & Co
Attorneys

UNITED STATES PATENT OFFICE.

RICHARD THOS. BISHOP, OF ST. LOUIS, MISSOURI, ASSIGNOR OF ONE-HALF TO THEODORE HUNT, OF SAME PLACE.

WHEEL.

SPECIFICATION forming part of Letters Patent No. 293,619, dated February 19, 1884.

Application filed November 27, 1883. (No model.)

*To all whom it may concern:*

Be it known that I, RICHARD T. BISHOP, a citizen of the United States, residing at St. Louis, in the county of St. Louis and State of Missouri, have invented a new and useful Wheel, of which the following is a specification, reference being had to the accompanying drawings.

This invention relates to wheels for vehicles, machinery, and other purposes; and it has for its objects, first, to reduce the friction to a minimum, thus insuring the easy running of the wheel; secondly, to provide improved means whereby the wheel may be easily tightened upon its bearings when the latter become worn; thirdly, to devise an improved construction, whereby the wheel shall be absolutely prevented from becoming loose upon or coming off the shaft or axle while in operation; and, fourthly, in an improved construction of the spindle, and the method of attaching the same to the shaft or axle, all as will be hereinafter fully described.

In the drawings hereto annexed, Figure 1 is a longitudinal sectional view of the end of an axle or shaft equipped with my improved wheel and spindle. Fig. 2 is a transverse sectional view on the line $x\ x$ in Fig. 1; and Fig. 3 is a detail view of the spindle detached.

The same letters refer to the same parts in all the figures.

A in the drawings designates the shaft or axle, the end of which is cut off diagonally, or beveled on its under side, as shown at B, and provided with a recess, C, the lower or inner side of which forms an outwardly-projecting lug or tongue, D. The upper edge of the outer end of the axle is provided with an overhanging flange, E, which, when the improvement is applied to vehicle-wheels, forms a sand-guard.

F designates the spindle, the outer end of which is tapering or conical, as shown, being largest at its outer end. The inner end of the spindle has an arm, G, the upper side of which is beveled, so as to fit against the end of the axle, and provided with a projecting portion, H, fitting in the recess C, the lug or tongue D of which forms a firm support for the innermost portion of the spindle-arm G. The spindle is secured to the end of the axle by means of clips or bands I, encircling the said spindle-arm and the end of the axle.

J designates the wheel, the hub of which comprises the sheath or casing K and the cap L. The sheath K consists, mainly, of a cylindrical sleeve, having at its inner end an inward-extending angular flange, M, provided about midway of its length with a bulging portion, N, forming an interior annular groove, O, and having near its outer end an exterior angular flange, P, against which rest the inner sides of the spokes Q, which are dovetailed at their inner ends. The outer end of the sleeve or sheath is interiorly screw-threaded, as at R, to receive the threaded flange S, projecting inward from the cap L, which latter may thus be tightened up against the spokes, so as to hold the latter in position. The angular flange S is interiorly screw-threaded, so as to receive a plug, T, terminating at its inner end in a conical point, U, and having at its outer end a polygonal opening or recess, V, to receive a suitably-constructed wrench or tool, by means of which it may be tightened when required.

Between the inner end of the sleeve or sheath of the hub and the cylindrical portion of the spindle are interposed a series of cylindrical anti-friction rollers, W, having pointed or conical ends X.

Placed in the interior groove, O, of the hub are a series of anti-friction balls, Y Y, bearing against the outer conical end of the spindle. The latter is provided at its outer end with a recess, Z, in which are placed anti-friction balls $A^2$, bearing against the conical end U of the plug T.

From the foregoing description, taken in connection with the drawings hereto annexed, the operation and advantages of this invention will be readily understood. The wheel is adjusted upon the spindle before the latter is attached to the axle, and the spindle being larger at its outer than at its inner end, will absolutely prevent the wheel from coming off. The attachment of the spindle to the axle is simple and easily effected, but is rigid and secure. The bearing of the wheel against the three sets of rollers insures the easiest motion with the least possible friction. Any slack caused by wear may be instantly compensated for by simply tightening the plug T, whereby the wheel will be drawn in an outward direction upon the spindle, and the rollers W and Y tightened up against the outer conical portion of the latter, while the conical bearing U of the plug T will be tightened against the friction-balls $A^2$. The sheath or casing of the hub also forms a capacious receptacle, which may be filled with oil, thus rendering the wheel self-lubricating.

I claim as my invention and desire to secure by Letters Patent of the United States—

1. The combination, with a shaft or axle beveled on its under side at its outer end, and having a recess provided at its inner or lower edge with an outwardly-extending lug, of a detachable spindle having a projecting portion adapted to fit in the said recess, and suitable connecting clips or bands, substantially as set forth.

2. The combination of an axle having beveled outer end, B, and overhanging flange E, with a detachable spindle having a tapering or conically-enlarged outer end, and inwardly-extending beveled arm G, and a wheel mounted upon the said spindle, substantially as set forth.

3. The combination, with a spindle having a tapering or conically-enlarged outer end, of a wheel consisting of a mainly cylindrical sheath or casing having a bulging portion forming an interior annular groove, an inward-projecting flange at its inner end, and an exterior angular flange near its outer end, and a cap having an inwardly-projecting threaded flange fitting in the outer end of the sheath, and interposed friction-rollers, substantially as set forth.

4. The combination of a spindle having a tapering or conically-enlarged outer end provided with a recess, Z, with a wheel comprising a sheath, K, having flanges M P, and interior annular groove O, cap L, having flange S, provided with exterior and interior screw-threads, and plug T, having conical inner end, U, and recess V, and the friction-rollers W, and balls Y and $A^2$, all arranged and operating substantially as set forth.

5. The combination, with a detachable spindle having tapering or conically-enlarged outer end provided with recess Z, of a wheel fitted or arranged upon said spindle, and equipped with a plug having a conically-pointed inner end entering the recess Z, and friction-balls placed in the said recess and bearing against the said plug, substantially as set forth.

In testimony that I claim the foregoing as my own I have hereto affixed my signature in presence of two witnesses.

RICHARD THOS. BISHOP.

Witnesses:
  J. T. WATSON,
  L. H. CONN.